(12) United States Patent
Tsai

(10) Patent No.: US 6,979,953 B2
(45) Date of Patent: Dec. 27, 2005

(54) AUTO-OPERATED DIP SWITCHING MECHANISM

(76) Inventor: Jui-Heng Tsai, 8F-1, No. 2, Taishun St., Taipei City (TW)

( * ) Notice: Subject to any disclaimer, the term of this patent is extended or adjusted under 35 U.S.C. 154(b) by 259 days.

(21) Appl. No.: 10/660,495

(22) Filed: Sep. 12, 2003

(65) Prior Publication Data
US 2005/0057937 A1    Mar. 17, 2005

(51) Int. Cl.$^7$ ................................................. B60Q 1/02
(52) U.S. Cl. .......................... 315/82; 315/83; 315/155; 315/156; 362/465; 250/205; 250/559.16
(58) Field of Search .............................. 315/77, 82, 83, 315/155, 156; 250/201.9, 205, 559.16, 214 D, 250/216; 362/460, 464, 465

(56) References Cited

U.S. PATENT DOCUMENTS

| | | | | |
|---|---|---|---|---|
| 2,850,673 A | * | 9/1958 | Beckman et al. | 315/83 |
| 3,083,294 A | * | 3/1963 | Lindberg et al. | 362/464 |
| 4,236,099 A | * | 11/1980 | Rosenblum | 315/83 |
| 6,281,632 B1 | * | 8/2001 | Stam et al. | 315/82 |
| 6,403,942 B1 | * | 6/2002 | Stam | 250/214 AL |

* cited by examiner

Primary Examiner—Haissa Philogene
(74) Attorney, Agent, or Firm—Troxell Law Office, PLLC

(57) ABSTRACT

An auto-operated dip switching mechanism includes a strong-light detector, a strong-light signal circuit, and a switching control circuit. The strong-light detector is mounted to a front end of a car to detect light projected from an opposite coming car. The strong-light detector is induced when the light projected thereto has intensity exceeded a preset value, and causes the strong-light signal circuit to produce a strong-light signal, with which the switching control circuit is immediately enabled to switch headlights of the car from high beams to low beams. And, the switching control circuit automatically switches the car from low beams to high beams when the strong-light signal circuit stops sending the strong-light signal.

6 Claims, 3 Drawing Sheets

US 6,979,953 B2

AUTO-OPERATED DIP SWITCHING MECHANISM

FIELD OF THE INVENTION

The present invention relates to an auto-operated dip switching mechanism, and more particularly to an auto-operated dip switching mechanism including a strong-light detector mounted to a front end of a car and inducible by a light that is projected thereto from a front car and has intensity exceeded a preset value, whereby when the detector is induced, it enables a strong-light signal circuit and a switching control circuit to automatically switch headlights of the car from high beam to low beam, and when the strong light no longer exists, the headlights of the car automatically switches from low to high beam again to avoid a driver from inconvenience and confusion in manually operating a dip switch on the car.

BACKGROUND OF THE INVENTION

The headlight for a car includes a high beam and a low beam, and a driver may select to use one of them or switch between them depending on actual road conditions. It is also known as a polite and safety measure in driving to switch high beam to low beam when meeting with an opposite coming car or getting close to a front car moving in the same direction. Generally, it is proper for a driver to switch from high beam to low beam when a distance from an opposite coming car is about 20 to 30 meters, or when a distance from a front car is about 1 to 3 meters, lest the driver of the opposite or the front car should be dangerously dazzled by the strong light projected toward him or a rearview mirror in the car, respectively. Up to date, most of the known dip switches are manually operated and a large number of drivers fail to timely operate the manual dip switch to effectively switch the headlight between high and low beams due to the driver's personal habit or negligence in driving. Moreover, repeated operation of the manual dip switch will inevitably bring inconvenience and confusion to the driver and even endanger the driver's safety in driving.

SUMMARY OF THE INVENTION

It is therefore a primary object of the present invention to provide an auto-operated dip switching mechanism to eliminate the drawbacks existed in manually operating the conventional dip switch.

To achieve the above object, the auto-operated dip switching mechanism of the present invention mainly includes a strong-light detector, a strong-light signal circuit, and a switching control circuit. The strong-light detector is mounted to a front end of a car to detect light projected thereto from a front side of the car. When the detected light has intensity exceeded a preset value, the auto-operated dip switching mechanism immediately switches headlights of the car from high beam to low beam; and when the strong light no longer exists, the headlights automatically switch from low beam to high beam again.

Another object of the present invention is to provide an auto-operated dip switching mechanism that may be incorporated with an existing dip switch control circuit on a car and provided with a control switch, so that a driver may selectively enable the auto-operated dip switching mechanism to substitute for the existing manually-operated dip switch.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
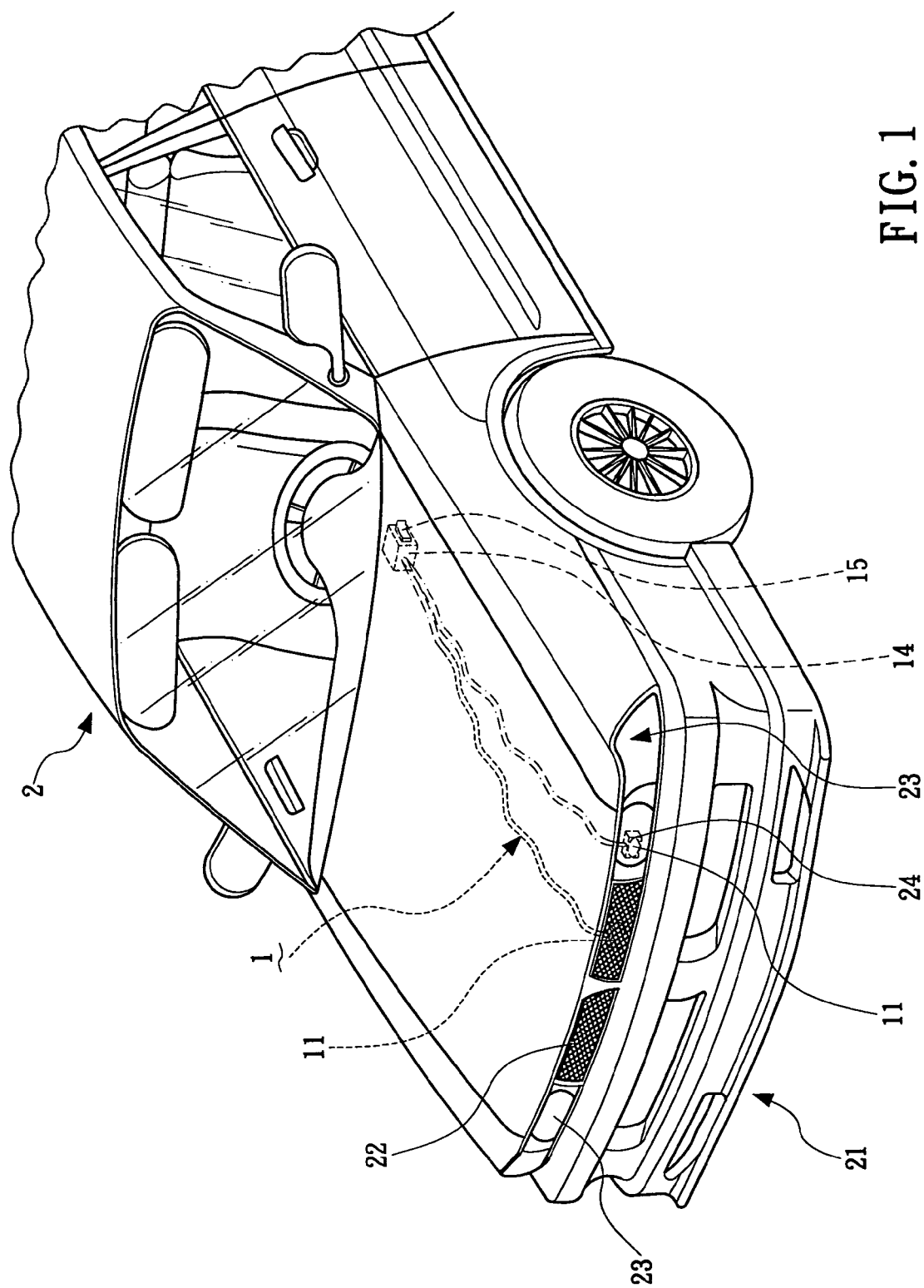
FIG. 1 is a fragmentary front perspective view showing mounting locations of the present invention on a car.
Figure 2:
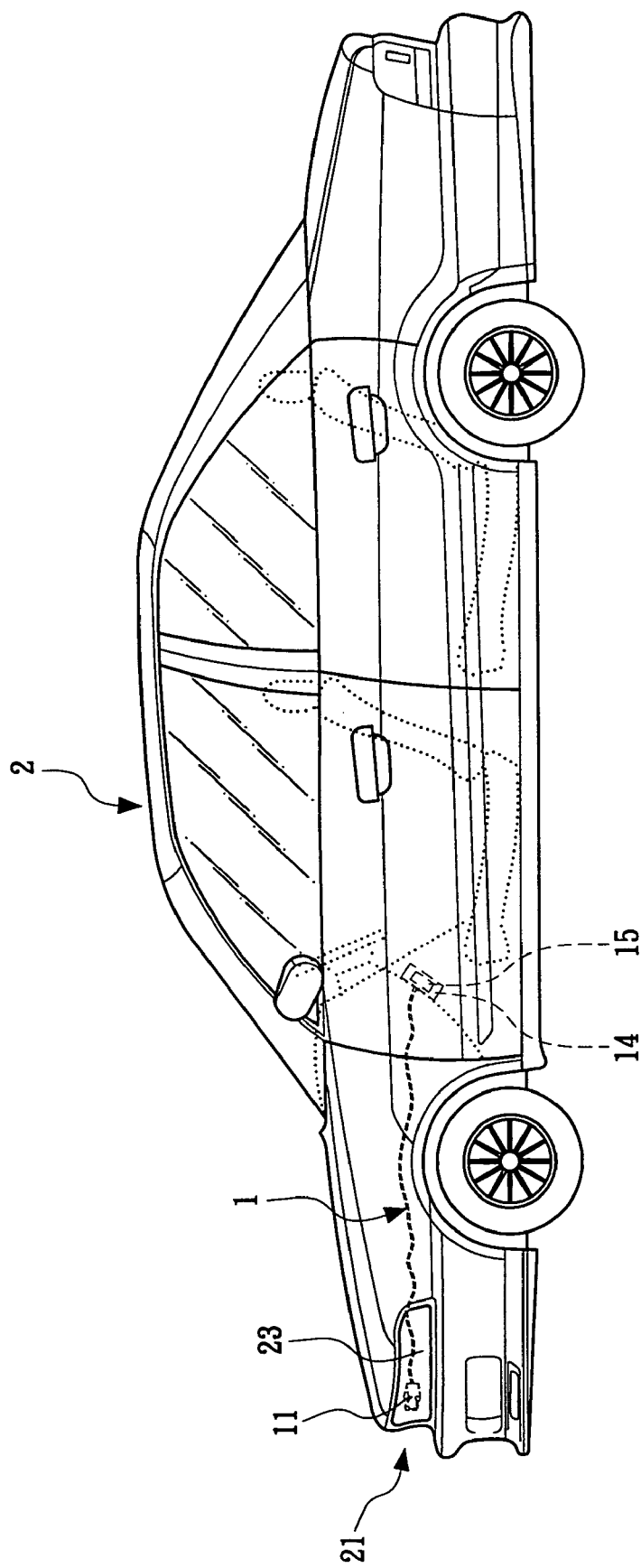
FIG. 2 is a side view of FIG. 1.
Figure 3:
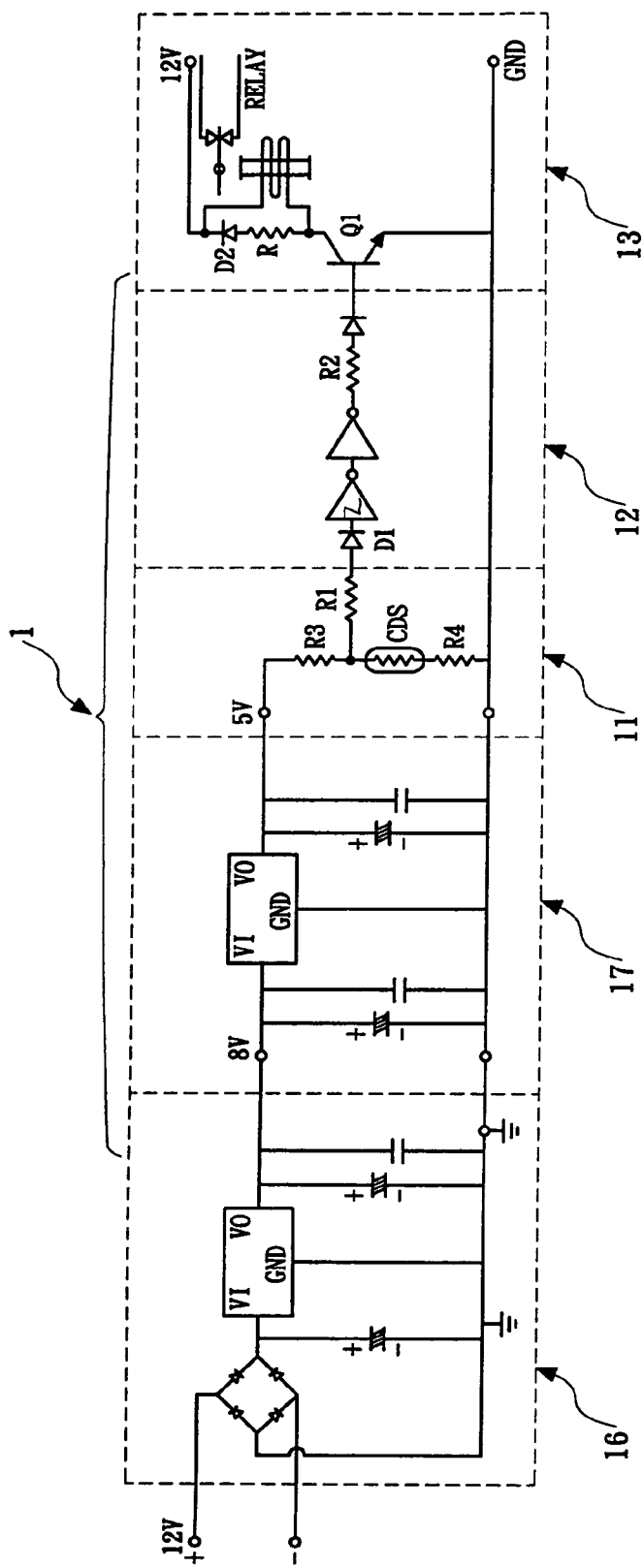
FIG. 3 is an embodiment of a circuit diagram for the present invention.

Please refer to FIGS. 1, 2, and 3 in which an auto-operated dip switching mechanism 1 according to the present invention is shown. As shown, the mechanism 1 of the present invention mainly includes a strong-light detector 11, a strong-light signal circuit 12, and a switching control circuit 13. The strong-light detector 11 is mounted to a front end 21 of a car 2 with a detecting side of the detector 11 facing forward to detect light projected toward the car 2 from a front side thereof. The strong-light detector 11 is electrically connected to the strong-light signal circuit 12 and the switching control circuit 13, while the switching control circuit 13 is electrically connected to high and low beams of the car 2. The strong-light detector 11 maybe mounted to the front end 21 of the car 2 at different locations, such as at a grille 22 that is generally provided at the front end 21 of the car 2, or in a compartment 24 preformed in a headlight module 23 of the car 2 without adversely affecting the intended illuminating function of the headlight module 23, as shown in FIGS. 1 and 2.

For the present invention to be widely employed on different types of cars, the strong-light signal circuit 12 and the switching control circuit 13 of the auto-operated dip switching mechanism 1 of the present invention may include two types of designs. The first design is to directly incorporate the strong-light signal circuit 12 and the switching control circuit 13 with an existed dip switch control circuit (not shown) on the car 2, and the second design is to locate the strong-light signal circuit 12 and the switching control circuit 13 in a separated box 14, which is provided with a switch 15 to control on and off of the auto-operated dip switching mechanism 1, as shown in FIGS. 2 and 3.

As can be seen from FIG. 3, the auto-operated dip switching mechanism 1 of the present invention may directly use a general 12V automotive battery as its power supply. The power supply from the 12V battery is first converted to a 5V power supply needed by the present invention using power-transforming circuits 16, 17. The strong-light detector 11 is faced forward to receive light projected thereto from a front car. When the received light has intensity exceeded a preset value, the detector 11 is induced to cause the strong-light signal circuit 12 to produce a strong-light signal, with which the switching control circuit 13 is immediately enabled to switch currently working high beams of the car 2 to low beams; and when the strong-light signal stops, the switching control circuit 13 automatically switches the low beams to the high beams immediately or after a preset period of time, such as, for example, 1 to 3 seconds.

Figure 4:
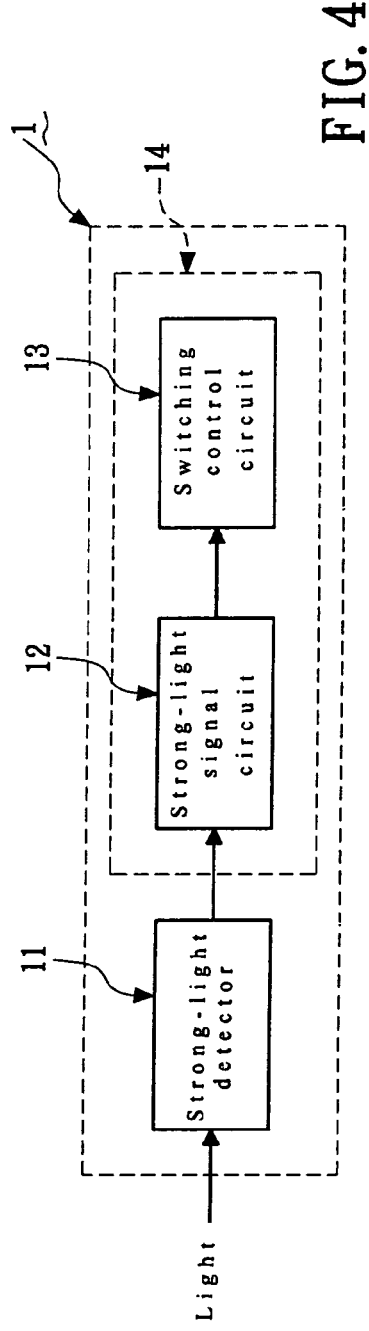
FIG. 4 is a block diagram of the present invention.

Please refer to FIGS. 1 and 4 at the same time. When driving on a mountain road or on a highway in the night with the headlights turned to high beams, a driver may select to turn on the auto-operated dip switching mechanism 1 of the present invention. To do so, simply turn on the mechanism 1 using the switch 15, so that the strong-light detector 11, the strong-light signal circuit 12, and the switching control circuit 13 are enabled. When the car 2 meets another car coming from an opposite direction, light from the headlights of the coming car, no matter high beams or low beams, would be projected on the strong-light detector 11 of the car 2. When the two cars gradually approach toward each other, so that the light projected on the strong-light detector 11 has intensity exceeded a preset value, such as, for example, the intensity of low beams at a distance of 20 to 25 meters between two cars, to induce the strong-light detector 11 and thereby enables the strong-light signal circuit 12 and the switching control circuit 13 to automatically switch the headlights of the car 2 from high beams to low beams.

In the course of meeting, the strong-light detector 11 is continuously induced and the headlights are kept in the position of low beams. And, after the meeting of two cars, the strong-light detector 11 is no longer induced and the strong-light signal circuit 12 stops sending the strong-light signal, causing the switching control circuit 13 to automatically switch the headlights from low beams to high beams as soon as the strong-light signal is ceased or after a preset time, for example, from 1 to 3 seconds. That is, the headlights of the car 2 would automatically switch between high and low beams in response to the meeting with an opposite coming car, and the driver needs not to manually switch the headlights in the whole process of meeting. With the auto-operated dip switching mechanism 1 of the present invention, the driver may therefore politely and safely complete the meeting with other cars in the night particularly on a narrow road.

In addition to enable a car to automatically switch between high and low beams in response to a strong light projected from an opposite coming car, the strong-light detector 11 may also be induced by light of the high beams of the car 2 that is projected to and reflected from a tail of a front car, enabling the auto-operated dip switching mechanism 1 to timely automatically switch the high beams to the low beams. In this manner, the light from the high beams of the car 2 would not be projected on a rearview mirror of the front car to dangerously dazzle the car driver.

What is claimed is:

1. An auto-operated dip switching mechanism, comprising a strong-light detector, a strong-light signal circuit, and a switching control circuit; said strong-light detector being mounted to a front end of a car with a detecting side thereof facing forward to detect light projected from an opposite coming car; said strong-light detector being electrically connected to said strong-light signal circuit and said switching control circuit, while said switching control circuit being electrically connected to high and low beams of said car; said strong-light detector being induced when said light projected thereto has intensity exceeded a preset value, and causing said strong-light signal circuit to produce a strong-light signal, with which said switching control circuit is immediately enabled to switch headlights of said car from high beams to low beams; and said switching control circuit automatically switching said car from low beams to high beams when said strong-light signal circuit stops sending said strong-light signal.

2. The auto-operated dip switching mechanism as claimed in claim 1, wherein said strong-light signal circuit and said switching control circuit are directly incorporated with an existing dip-switch control circuit on said car.

3. The auto-operated dip switching mechanism as claimed in claim 1, wherein said strong-light signal circuit and said switching control circuit are mounted in a separated box, on which an external control switch is provided.

4. The auto-operated dip switching mechanism as claimed in claim 1, further comprising power supply transforming circuits for converting a battery supply on said car into a power supply needed by said auto-operated dip switching mechanism to work.

5. The auto-operated dip switching mechanism as claimed in claim 1, wherein said strong-light detector is mounted to a front end of said car at a grille thereof.

6. The auto-operated dip switching mechanism as claimed in claim 1, wherein said strong-light detector is mounted in a compartment preformed on a headlight module of said car when said headlight module is manufactured.

* * * * *